May 26, 1925.
A. PANSCIK
DRAWKNIFE
Filed July 25, 1924
1,539,766
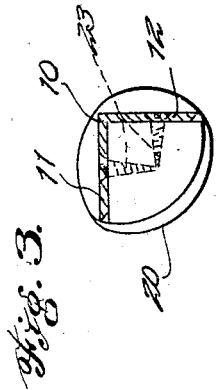
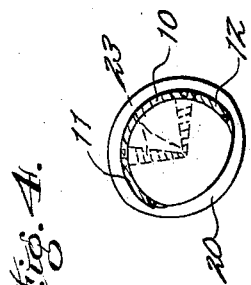
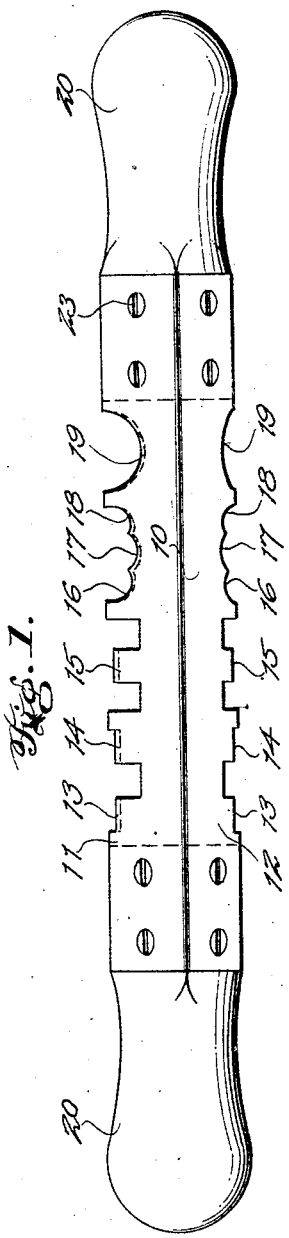
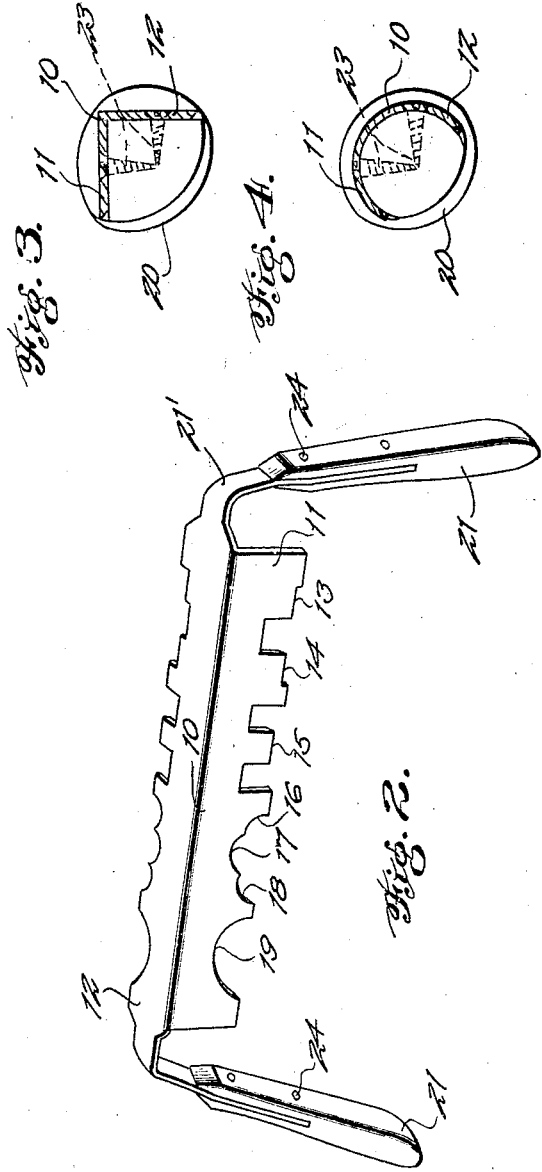
Adam Panscik
INVENTOR
BY Victor J. Evans
ATTORNEY
WITNESS:

Patented May 26, 1925.

1,539,766

UNITED STATES PATENT OFFICE.

ADAM PANSČIK, OF TAYLOR SPRINGS, ILLINOIS.

DRAWKNIFE.

Application filed July 25, 1924. Serial No. 728,242.

*To all whom it may concern:*

Be it known that I, ADAM PANSČIK, a citizen of the United States, residing at Taylor Springs, in the county of Montgomery and State of Illinois, have invented new and useful Improvements in Drawknives, of which the following is a specification.

This invention relates to cutting tools, and has for its primary object the provision of a novel cutting tool in the form of a drawing knife having its cutting edges arranged at angles with respect to each other and being of such shape as to cut mouldings or the like of different cross sectional configurations.

Another object is to provide a cutting tool formed into angle disposed sections and provided with handles arranged in a manner whereby the tool may be conveniently used on fine work.

A still further object is to provide a draw knife which will be simple and inexpensive to manufacture, efficient, durable in use, and a general improvement in the art.

This invention also consists in certain other features of construction and in the combination and arrangement of the several parts, to be hereinafter fully described and illustrated in the accompanying drawings and specifically pointed out in the appended claims.

In describing my invention in detail, reference will be had to the accompanying drawings wherein like characters denote like or corresponding parts throughout the several views, and in which:

In the drawings:—

Figure 1 is an elevation of one form of the tool.

Figure 2 is a perspective view showing a modified form of the handles.

Figure 3 is a sectional view taken on line 3—3 of Figure 1.

Figure 4 is a sectional view of a modified form of blade.

Referring to the drawings in detail, I have shown the invention as comprising an elongated blade 10 of any desired length, width and thickness and constructed of suitably tempered steel. As shown in Figure 1 the blade 10 is of novel shape and is formed by being bent longitudinally upon itself to provide a pair of sections 11 and 12, respectively, which are arranged at right angles with respect to each other, thereby forming a blade of substantially V-shaped in cross section, as clearly shown in Figure 3 of the drawings. The cutting edges of the respective sections of the blades are formed of peculiar shape to define a series of knife members 13, 14, 15, 16, 17, 18 and 19. All of these knife members are of different shapes and sizes, so as to cut different types of mouldings, as for instance the knife members 13 and 14 will cut grooves with a tongue therebetween, a grooved face 19, a semicircular tongue, and so on. It is of course conceivable that the specific shapes of these cutting portions may be varied and the dimensions may also be altered. It should be noted that the sections 19 could also be used for smoothing axes or pick handles, as will be readily apparent. It is of course necessary to provide handles for the structure and in carrying out this feature I provide handle members 20 having a rounded outer end whereby it may be conveniently grasped by the user of the device, and practically adapt the tool for fine work. The handle members 20 are secured to both of the sections of the blade 10 and the portion of the handle to which the blade is secured is substantially V-shaped, as shown to conform to the shape of the blade.

In Figure 2 of the drawings there is illustrated a modified form of handles which are considerably smaller than the handles 20 and for distinction are indicated by the reference numeral 21. Reduced projections 21′ extend from the ends of the section 12 and are rounded at a point adjacent their juncture with the section 12 and terminate in parallelism at an angle with respect to the blade. The handles 21 being longitudinally slotted to receive the projections as clearly shown in Figure 2 of the drawings. As shown in Figure 1, screws 23 pass through the blade and handles respectively for holding the parts associated, while the form shown in Figure 2 has its handles 21 fixed to the projections through the medium of rivets 24.

There is shown in Figure 4 of the drawings, a modified form of blade which is substantially semi-circular in cross section, the function of this blade being substantially the same as the right angle shaped form.

From the foregoing description and a study of the drawings it will be apparent that I have thus provided a simply constructed and inexpensive drawing knife which will be very highly advantageous in cutting mouldings and the like and for a wide variety of purposes pertaining to such.

Owing to the simplicity of the construction and the fewness of the parts it is apparent that there is nothing to be out of order, so that the device will have a long life and will satisfactorily perform all its functions. It should be duly noted that the shape of the blade members of each section are identical and the same shape blade members are arranged opposite each other whereby they may be used for cutting on both an inward or outward stroke. If only one section is used to perform the function of cutting, the opposite section will provide an adequate guiding means. Again, by the peculiar construction of the blade member it is practically impossible to overcut the material which is being cut, as the companion cutting section will prevent such a casualty.

It is thought from the foregoing description that the advantage and novel features of my invention will be readily apparent.

I desire it to be understood that I may make changes in the construction and in the combination and arrangement of the several parts, provided that such changes fall within the scope of the appended claims.

Having described my invention, what I claim as new is:—

1. A tool of the character described comprising an elongated blade member provided with cutting edges arranged at right angles to each other.

2. A tool of the character described comprising a pair of sections arranged at right angles to each other, cutting edges formed on the outer edges of the sections and each cutting edge having formed thereon a series of blade members as and for the purpose specified.

3. A tool of the character described comprising a pair of sections having a pair of cutting members arranged at right angles with respect to each other, projections depending from the opposite end of one of said sections and handles fixed to the projections.

In testimony whereof I affix my signature.

ADAM PANSČIK.